United States Patent
Ha et al.

(10) Patent No.: US 7,591,585 B2
(45) Date of Patent: Sep. 22, 2009

(54) TEMPERATURE MEASURING DEVICE

(75) Inventors: Kyoung Su Ha, Daejeon (KR); Boo Gon Woo, Daejeon (KR); Jun Seok Ko, Daejeon (KR); Seong Pil Kang, Daejeon (KR); Seok Hwan Choi, Daejeon (KR); Sang Youn Lee, Seoul (KR); Young Bae Kim, Yeosu-si (KR)

(73) Assignee: LG Chem, Ltd. (KR)

( * ) Notice: Subject to any disclaimer, the term of this patent is extended or adjusted under 35 U.S.C. 154(b) by 142 days.

(21) Appl. No.: 11/453,117

(22) Filed: Jun. 14, 2006

(65) Prior Publication Data

US 2006/0284723 A1 Dec. 21, 2006

(30) Foreign Application Priority Data

Jun. 14, 2005 (KR) .................. 10-2005-0050852

(51) Int. Cl.
*G01K 1/14* (2006.01)
*G01K 13/00* (2006.01)
*G01K 7/02* (2006.01)

(52) U.S. Cl. .................. 374/100; 374/141; 374/179

(58) Field of Classification Search .............. 374/100, 374/110–115, 136, 137, 163, 183, 185, 179, 374/208; 73/866.5; 136/200
See application file for complete search history.

(56) References Cited

U.S. PATENT DOCUMENTS

| | | | | |
|---|---|---|---|---|
| 2,366,694 A | * | 1/1945 | Bender .................. 73/152.13 |
| 2,646,681 A | * | 7/1953 | Walton .................. 374/111 |
| 2,676,914 A | * | 4/1954 | Podbielniak .................. 202/160 |
| 3,090,233 A | * | 5/1963 | Shields et al. .................. 374/142 |
| 3,161,050 A | * | 12/1964 | Exner .................. 73/295 |
| 3,175,015 A | * | 3/1965 | Johnson .................. 585/263 |
| 3,614,387 A | * | 10/1971 | Wrob et al. .................. 392/498 |
| 3,650,414 A | * | 3/1972 | Asada et al. .................. 374/140 |
| 3,677,799 A | * | 7/1972 | Hou .................. 427/569 |
| 4,281,985 A | * | 8/1981 | Mee et al. .................. 432/205 |
| 4,362,403 A | * | 12/1982 | Mooney .................. 374/4 |
| 4,384,793 A | * | 5/1983 | O'Brien .................. 374/115 |

(Continued)

FOREIGN PATENT DOCUMENTS

JP 02-093291 4/1990

(Continued)

OTHER PUBLICATIONS

International Search Report dated Oct. 19, 2006 for Application No. PCT/KR2006/002261.

(Continued)

*Primary Examiner*—Gail Verbitsky
(74) *Attorney, Agent, or Firm*—Cantor Colburn LLP

(57) ABSTRACT

Disclosed is a temperature measuring device. The temperature measuring device includes: a thermo-well tube; and a cable or wire type temperature measuring means which is installed in a thermo-well tube, wherein temperature measuring means has temperature detecting sensors disposed at an intermediate portion thereof, and the temperature detecting sensors can be moved axially in the thermo-well tube by applying tension to both ends of the cable or wire type temperature measuring means. The present invention also provides a reaction tube in which the temperature measuring device is disposed axially, and a reactor including at least one temperature measuring device or reaction tube as described above.

13 Claims, 3 Drawing Sheets

U.S. PATENT DOCUMENTS

| | | | | |
|---|---|---|---|---|
| 4,448,250 | A | * | 5/1984 | Cooke et al. .............. 166/255.1 |
| 4,595,300 | A | | 6/1986 | Kaufman |
| 4,846,584 | A | * | 7/1989 | Burch et al. ................... 374/31 |
| 4,848,927 | A | * | 7/1989 | Daily et al. .................. 374/208 |
| 4,925,638 | A | * | 5/1990 | Chakravarti et al. .......... 422/310 |
| 5,108,192 | A | * | 4/1992 | Mailliet et al. .............. 374/139 |
| 5,209,571 | A | | 5/1993 | Kendall |
| 5,631,418 | A | * | 5/1997 | Stuns et al. .............. 73/335.05 |
| 5,812,588 | A | * | 9/1998 | Deak et al. .................. 374/166 |
| 5,832,999 | A | * | 11/1998 | Ellwood ..................... 166/256 |
| 6,575,623 | B2 | * | 6/2003 | Werneth ..................... 374/179 |
| 7,004,625 | B2 | * | 2/2006 | Egidio ........................ 374/166 |
| 2004/0129093 | A1 | * | 7/2004 | Hauge ....................... 73/865.9 |
| 2006/0245469 | A1 | * | 11/2006 | Koeniger .................... 374/208 |

FOREIGN PATENT DOCUMENTS

| | | |
|---|---|---|
| KR | 07198639 | 8/1995 |
| KR | 10-1996-0011396 | 4/1996 |

OTHER PUBLICATIONS

Korean Notice of Allowance dated Nov. 2, 2007.

* cited by examiner

TEMPERATURE MEASURING DEVICE

This application claims the benefit of the filing date of Korean Patent Application No. 2005-50852, filed on Jun. 14, 2005, in the Korean Intellectual Property Office, the disclosure of which is incorporated herein in its entirety by reference.

FIELD OF THE INVENTION

The present invention relates to a temperature measuring device, and more particularly to a temperature measuring device which can be used to measure temperature in a tubular reactor, preferably to easily measure temperature of a catalyst layer in a shell-and-tube heat exchanger-type reactor including at least one reaction tube which is filled with the fixed catalyst layer(s).

BACKGROUND OF THE INVENTION

The shell-and-tube heat exchanger-type reactor may be used for catalytic vapor phase oxidation, for example, for a process of manufacturing unsaturated acid from olefin using a catalyst in vapor.

Generally, the shell-and-tube heat exchanger-type reactor includes reaction tubes filled with at least one kind of granule catalyst, which receives reaction gas provided through a pipe. In the heat exchanger-type reactor, the reaction gas contacts with and reacts upon the catalyst in the reaction tubes so as to generate a desired product. Reaction heat generated in the reaction is transferred to and removed by heat transferring media which circulate in shells provided on a peripheral surface of the reaction tubes and are maintained at a predetermined temperature. The reaction mixture containing the desired product is carried through a pipe to a recovery and refining device.

Generally, catalytic vapor phase oxidation is a highly exothermic reaction. Therefore, it is important to control reaction temperature in a certain range as well as to reduce the size of the temperature peak at a hot spot occurring in a reaction zone. Specifically, it is very important to rapidly detect a location of the heat point in the catalyst layer and to accurately measure the size of the temperature peak at the hot spot, in consideration of process conditions, feed composition, and structure of catalyst layers.

In order to measure temperature of the hot spot, the conventional shell-and-tube heat exchanger-type reactor includes a plurality of reaction tubes each of which has a thermo-well tube mounted therein and at least one thermocouple. Some of the thermocouples are fixed type thermocouples which are located at fixed points in the reaction tube, while the rest are movable type thermocouples which can be inserted into and drawn into and out the thermo-well tube as well as moved within some range of the thermo-well tube.

In such a temperature measuring device, the role of the movable thermocouple is very important. As described above, the location of the hot spot is determined according to the process conditions, the feed composition, and the structure of the catalyst layers, while the size of the temperature peak at a hot spot is also determined according to the heat controlling capacity of the heat transferring media. Therefore, it is necessary to insert or draw the movable thermocouple into and out the thermo-well tube so as to monitor the accurate location and size of the hot spot.

Further, the movable thermocouple helps an operator to obtain the temperature profile of the entire catalyst bed for the whole length of the reaction tube. There are much information obtained from the temperature profile of the catalyst bed, through which the operator can easily and visually analyze whether the hot spot is occurred, whether the catalyst particles are evenly distributed, whether it is necessary to control the reaction temperature, and whether the reactor normally operates.

However, since the temperature of the catalyst layer in the reactor having the fixed catalyst layer generally increases to $200°$ C.~$500°$ C. due to the highly exothermic reaction, the thermo-well tube protecting the thermocouple is thermally expanded and extremely deformed due to bending or twisting, thereby making it difficult to move the thermocouple.

In order to obtain the temperature profile of the catalyst layer, the thermocouple having a low mechanical strength should be inserted into the reaction tube along its whole length, i.e. from several meters to several tens of meters in the thermo-well tube. However, the thermocouple is subjected to a great friction resistance while moving in the thermo-well tube deformed by the thermal effect, so that its sensor may fail to reach a desired point in the thermo-well tube. Furthermore, the thermocouple may be broken due to an unsuitable insertion thereof.

When the thermocouple is broken while it is being inserted in the thermo-well tube, there is no way to withdraw the inserted broken thermocouple from the thermo-well tube, resulting in a seriously negative effect on the monitoring of the temperature.

SUMMARY OF THE INVENTION

Accordingly, the present invention has been made to solve the above-mentioned problems occurring in the prior art, and an object of the present invention is to provide a temperature measuring device which has a temperature measuring means, such as a thermocouple, capable of easily moving even in a deformed thermo-well tube.

In order to accomplish the object, the present invention provides a temperature measuring device comprising: a thermo-well tube; and a cable or wire type temperature measuring means which is installed in a thermo-well tube, wherein temperature measuring means has temperature detecting sensors disposed at an intermediate portion thereof, and the temperature detecting sensors can be moved axially in the thermo-well tube by applying tension to both ends of the cable or wire type temperature measuring means. The present invention also provides a reaction tube in which the temperature measuring device is disposed axially, and a reactor including the temperature measuring device as described above and/or the reaction tube as described above.

The temperature measuring device according to the present invention can be installed in a reaction tube or a shell space of the reactor.

DETAILED DESCRIPTION OF THE PREFERRED EMBODIMENTS

Hereinafter, a preferred embodiment of the present invention will be described with reference to the accompanying drawings.

Figure 1:
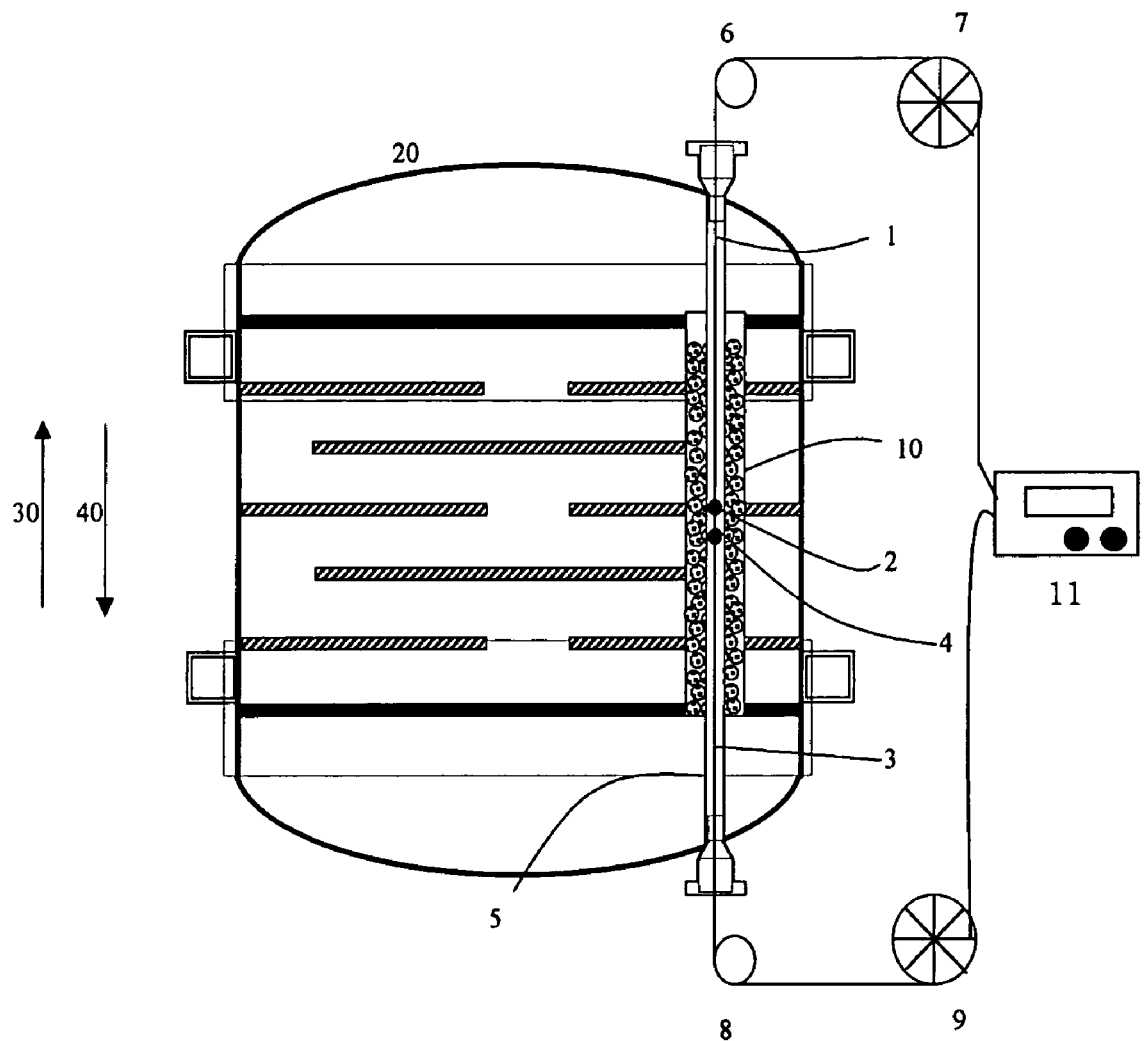
FIG. 1 is a schematic view of a shell-and-tube heat exchanger-type reactor having a temperature measuring device according to the present invention.

As shown in FIG. 1, the present invention is characterized in that a temperature measuring means installed in a thermo-well tube is made in a cable or a wire type and has temperature detecting sensors disposed at an intermediate portion thereof, thereby to enable the temperature detecting sensors to move axially in the thermo-well tube when the temperature measuring means is subjected at both ends thereof to tension.

Preferably, pulleys are installed at the outside of openings formed at both ends of the thermo-well tube respectively, by which the cable or wire type temperature measuring means is suspended. The direction for applying the tension can be changed by using the pulleys while the tension is applied to the temperature measuring means. Further, a position of the temperature detecting sensors can be easily moved by using a little force. Thus, if the temperature measuring means is merely pulled using the tension, the operator can easily measure the temperature in the entire region of the tubular reactor and can facilitate to identify the thermal stability of the entire catalyst layer in the reaction tube.

Further, the cable or wire type temperature measuring means preferably has the flexibility. When the temperature measuring means is made of a flexible material like wire, the flexibility of the temperature measuring means can compensate for a weakened movement of the temperature measuring means even though the thermo-well tube is deformed. Specifically, it is possible to prevent the temperature measuring means from being damaged due to the mechanical friction occurring when the temperature measuring means is pushed and inserted into the thermo-well tube.

In the temperature measuring means according to the present invention, it is preferable that the temperature detecting sensor is embedded in the tubular shaped junction portion and the cable or wire type temperature measuring means is physically connected to the junction portion.

Two cable or wire type temperature measuring means may be linearly connected to each other. In the case of using two temperature measuring means, even though one of the temperature detecting sensors gets out of order due to the deterioration thereof or the mechanical friction during the movement thereof, it is possible to continuously measure the temperature using the remaining one.

According to the present invention, the thermo-well tube is made of stainless steel. However, the present invention does not limit the material for the thermo-well tube to that described above. If necessary, the stainless steel containing relatively more carbon may be used in order to increase the hardness of the thermo-well tube. Further, the stainless steel containing relatively more chrome may be used in order to increase the high-temperature hardness and the corrosion resistance of the thermo-well tube. In addition, the stainless steel containing relatively more nickel may be used in order to increase the corrosion resistance and the toughness of the thermo-well tube. In order to increase the acid resistance of the thermo-well tube so as to prevent the corrosion of the thermo-well tube due to high acid material, an alloy containing molybdenum, such as hastelloy, may be used as the material for the thermo-well tube.

On the other hand, in a case where there exists a difficulty in transferring heat in the thermo-well tube, oil used for a high temperature may be filled in the thermo-well tube, thereby reducing the resistance for the heat transfer.

The cable or wire type temperature measuring means according to the present invention includes thermocouples and resistance temperature detectors. However, the present invention does not limit the temperature measuring means to those described above. In consideration of temperature range to be measured and reaction time to be required, the thermocouple or the resistance temperature detector suitable for the measured object can be selected.

Hereinafter, the present invention will be described in detail with relation to the thermocouple.

The thermocouple is made in such a manner that two kinds of conductive metals are adhered to each other so as to form a closed circuit. The principle of the thermocouple is that when both contact points of the thermocouple have different temperatures, electric current flows between the contact points of the thermocouple. Thus, the operator measures the electric current and then identifies the temperature difference between the contact points of the thermocouple. Therefore, if the contact points (hereinafter, referred to as a thermocouple sensor) of the thermocouple are located at suitable position in the thermo-well tube, it is possible to accurately measure temperature. Accordingly, the thermo-well tube is necessary for protecting the thermocouple in order to locate the thermocouple sensor at the accurate position and the suitable circumstance.

Figure 2:
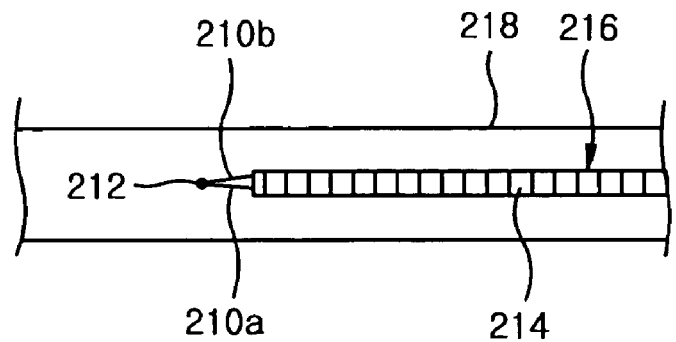
FIG. 2 is a schematic view showing a thermocouple and a thermo-well tube.

FIG. 2 is a schematic view showing the thermocouple and the thermo-well tube.

Referring to FIG. 2, there are two filaments 210a and 210b made of different materials, of which one ends are jointed to each other so as to form a sensor 212 of the thermocouple.

Such a thermocouple sensor 212 detects temperature at a certain position and converts it into electric signal. On the other hand, the remaining portion of the filaments 210a and 210b, excepting the thermocouple sensor 212, is insulated by means of an insulator 214. Further, the insulator 214 can supply supporting force to the contact point 212 of the filaments 210a and 210b so that the contact point 212 is located over a flat zone.

Meanwhile, the thermo-well tube 218 for the thermocouple is used for protecting the thermocouple from a high temperature, an acid, a base, and a mechanical friction, etc. The thermocouple 216 including the filaments 210a and 210b and the insulator 214 is inserted into a linear type thermo-well tube 218 having a predetermined length.

Preferably, the thermo-well tube 218 for the thermocouple is installed at a central portion of a cross-section perpendicular to the axis of reaction tube, of which the temperature is measured.

The inner space of the thermo-well tube is insulated from the reacting field. Further, the position at which the temperature will be measured, i.e. the position of the thermocouple sensor, can be changed by adjusting the tension applied to both ends of the thermocouple.

FIG. 1 schematically shows a shell-and-tube heat exchanger-type reactor 20 in which the temperature measuring device according to the present invention is installed. In the cable or wire type temperature measuring means according to the present invention, a pair of thermocouples, which are linearly connected to each other, is preferably used. Thus, the present invention will be described with respect to the temperature measuring means having the pair of thermocouples.

The shell-and-tube heat exchanger-type reactor generally includes several thousands to several tens of thousands of reaction tubes. However, FIG. 1 shows only one representative reaction tube 10 in order to illustrate the present invention. Reference numeral 1 depicts one thermocouple, reference numeral 2 indicates a sensor of the thermocouple for detecting temperature, and reference number 3 shows another thermocouple. Further, reference numeral 4 depicts a sensor of the thermocouple 3, reference numeral 5 indicates a thermo-well tube, reference numeral 6 depicts a pulley for supporting the thermocouple 1, and reference 7 shows a winder for winding and drawing the thermocouple 1 thereon, which manually or automatically operates. Reference numeral 8 depicts a pulley for supporting the thermocouple 3, and reference numeral 9 depicts a winder for winding and drawing the thermocouple 3. In FIG. 1, reference numeral 30 indicates a direction of drawing the thermocouple 1, and a reference numeral 40 shows a direction of drawing the thermocouple 3. Reference numeral 11 depicts a device for displaying the temperature measured by the sensors, which converts electric signal into the temperature value.

If the thermocouples 1 and 3 have sufficient flexibility and are used like a wire which can be bent and wound, the present invention does not limit the material for the thermocouples. The thermocouples preferably are smoothly unrolled due to their ductility and malleability when they are to be drawn by using the tension. Therefore, the thermocouples are very advantageous of passing through the deformed thermo-well tube.

Figure 3:
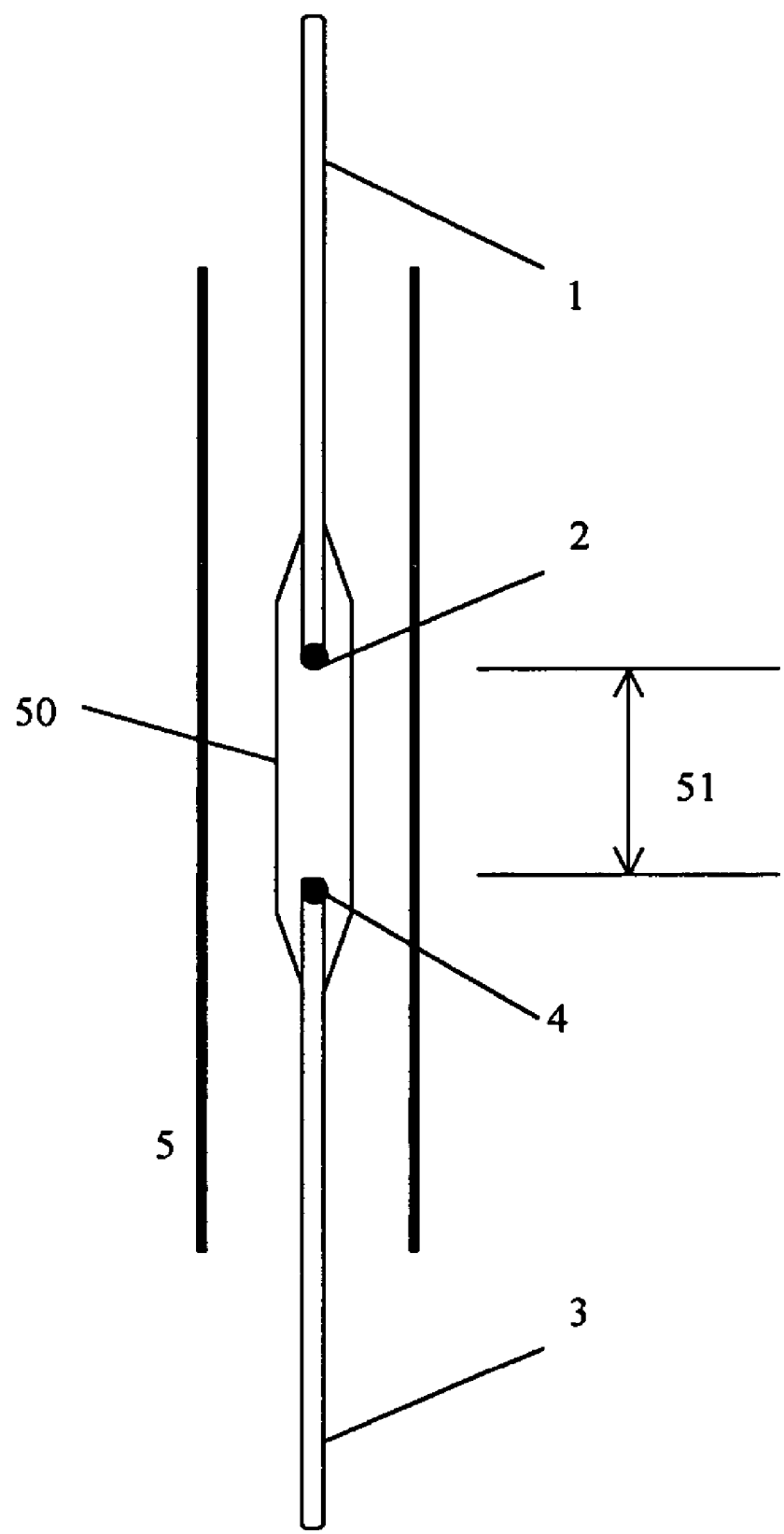
FIG. 3 is a schematic view showing a variation of the temperature detecting sensor in the temperature measuring device according to the present invention.
Figure 4:
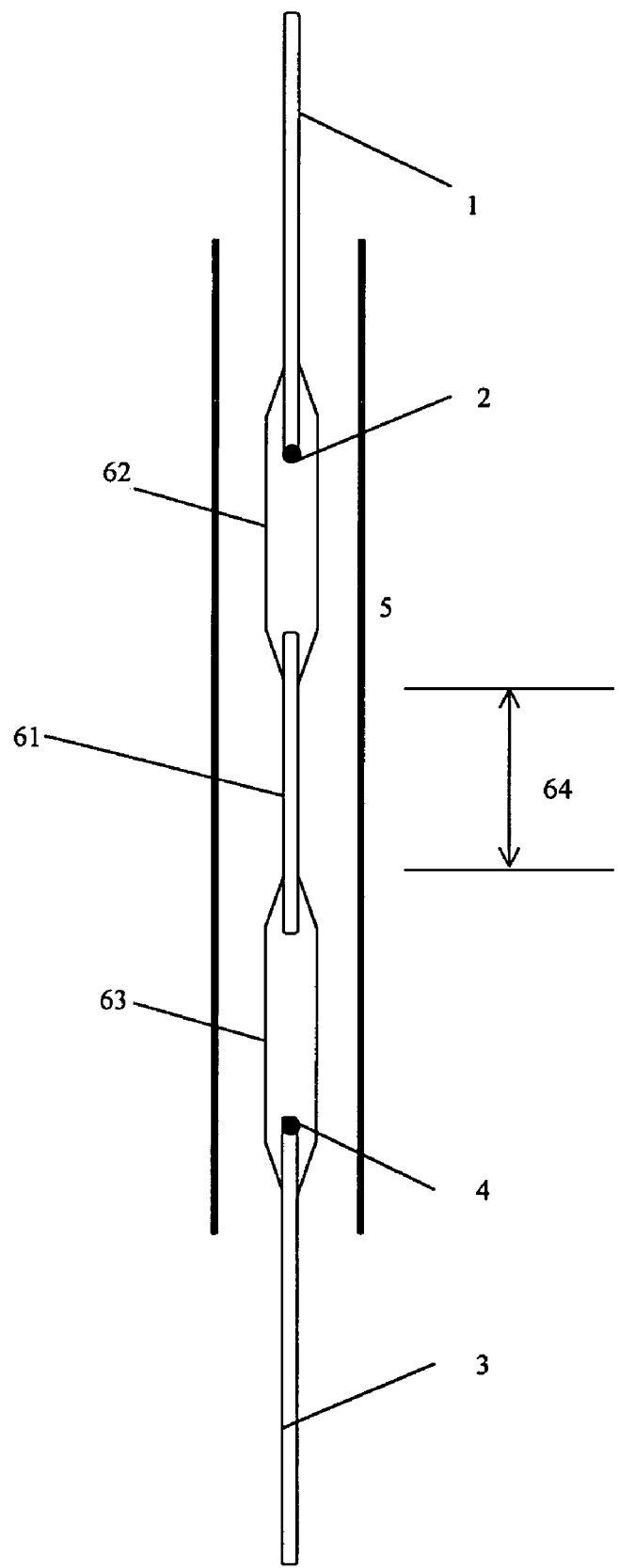
FIG. 4 is a schematic view showing another variation of the temperature detecting sensor in the temperature measuring device according to the present invention.

Meanwhile, the method of connecting the pair of thermocouples is shown in detail in FIGS. 3 and 4.

Preferably, the sensors of the pair of thermocouples are embedded and connected in one junction portion (see FIG. 3), or the sensors are embedded in the junction portions respectively before the junction portions are connected to each other by a connection member (see FIG. 4).

As shown in FIG. 3, two thermocouples are connected by the junction portion 50. At this time, the tube type junction portion 50 receives the thermocouples 1 and 3 and is subjected to pressure at a portion overlapping with a portion of the thermocouple but the sensor, so as to be integrated with the thermocouple. As described above, the junction portion is necessary for connecting two independent wire type temperature measuring means, for example thermocouples.

The junction portion can be made of material similar to that of aforementioned thermo-well tube. However, the characteristics such as acid resistance, corrosion resistance, etc. are not required to the material for the junction portion because the junction portion cannot make a direct contact with the reactive substance which the thermo-well tube is in contact with. The junction portion preferably has thermal resisting property, cold resisting property and high heat conductivity, so as to accurately measure the temperature.

In order to increase the heat conductivity, oil and the like may be used in the junction portion. Further, the oil may be also injected into the thermo-well tube so to easily perform the heat-transfer from the catalyst layer to the sensors.

Preferably, the junction portion has a tube shape. Further, the junction portion has a small inner diameter enough to hardly affect the heat transfer.

The junction portion preferably has an outer diameter equal to or less than 90% of the inner diameter of the thermo-well tube. If the outer diameter of the junction portion is larger than 90% of the inner diameter of the thermo-well tube, the junction cannot move in the event that the thermo-well tube is thermally deformed.

In FIG. 3, a reference numeral 51 indicates a distance between the sensors of two thermocouples. If the distance is suitably adjusted, a damaged thermocouple may be cut and removed and then a new thermocouple may be inserted into an extra space in the junction portion, instead of a damaged thermocouple, even though one of the thermocouples is damaged.

Specifically, the damaged portion of thermocouple is cut out and drawn out along with a part of the junction portion. Then the other part of the usable portions of the thermocouple and the junction portion are drawn out of the thermo-well tube. Next, a new thermocouple is inserted into the rest of the cut junction portion attached to the usable thermocouple and then pressure is applied to a portion of the junction portion which does not overlap with the sensor, so that the junction portion is integrated with the thermocouple. For example, if the thermocouple 1 of FIG. 3 has a problem of the sensor, the junction portion 51 is cut at position near the thermocouple 1 and then the new thermocouple is inserted into and integrated with the remaining portion 51 of the junction portion.

FIG. 4 is a schematic view showing another variation of the temperature sensor in the temperature measuring device according to the present invention. The two junction portions 62 and 63 are connected by using a connection member 61, for example a wire, which has an excellent elasticity and ductility.

In FIG. 4, a reference numeral 64 indicates a distance between two junction portions in which sensors of the thermocouples are respectively embedded. If the distance is suitably adjusted, the connection member 61 is cut at a suitable portion thereof and then the connection member 61 can be connected to a new junction portion.

INDUSTRIAL APPLICABILITY

The temperature measuring device according to the present invention can easily measure the temperature while being moved by using tension, in comparison with the conventional device. Further, it is possible to avoid affecting a temperature monitoring system due to damage thereof, and to easily replace the damaged measuring device with another one.

In addition, since the temperature measuring device according to the present invention includes at least two temperature detecting sensors or at least two temperature measuring means, it is possible to continuously measure the temperature without replacement of the damaged element even though one of the temperature detecting sensors or the temperature measuring means is damaged. Further, the temperature measuring device has an advantage in that the temperature detecting sensor or the temperature measuring means can be easily replaced, maintained and repaired.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A temperature measuring device comprising:
   a thermo-well tube;
   a cable or wire type temperature measuring means which is installed in a thermo-well tube; and
   pulleys installed at outside of openings formed at both ends of the thermo-well tube, respectively,
   wherein the temperature measuring means has temperature detecting sensors disposed at an intermediate portion thereof,
   the temperature detecting sensors are moved axially in the thermo-well tube by applying tension to both ends of the cable or wire type temperature measuring means, the temperature detecting sensors include a pair of temperature sensors which are contained in a tube type junction portion and connected to each other, or a pair of temperature sensors which are respectively contained in each tube type junction portion and connected to each other by a connection portion, and the pulleys are used when the tension is applied to the cable or wire type temperature measuring means.

2. The temperature measuring device as claimed in claim 1, wherein the cable or wire type temperature measuring means has flexibility.

3. The temperature measuring device as claimed in claim 1, wherein the cable or wire type temperature measuring means includes a thermocouple or a resistance temperature detector.

4. The temperature measuring device as claimed in claim 1, wherein the thermo-well tube is filled with oil.

5. The temperature measuring device as claimed in claim 1, wherein the junction portions are filled with oil.

6. The temperature measuring device as claimed in claim 1, wherein the junction portions have an outer diameter which is equal to or less than 90% that of an inner diameter of the thermo-well tube.

7. A reaction tube in which the temperature measuring device claimed in claim 1 is disposed axially,
the temperature measuring device comprising:
a thermo-well tube;
a cable or wire type temperature measuring means which is installed in a thermo-well tube; and
pulleys installed at outside of openings formed at both ends of the thermo-well tube, respectively,
wherein temperature measuring means has temperature detecting sensors disposed at an intermediate portion thereof,
the temperature detecting sensors are moved axially in the thermo-well tube by applying tension to both ends of the cable or wire type temperature measuring means,
the temperature detecting sensors include a pair of temperature sensors which are contained in a tube type junction portion and connected to each other, or a pair of temperature sensors which are respectively contained in each tube type junction portion and connected to each other by a connection portion, and
the pulleys are used when the tension is applied to the cable or wire type temperature measuring means.

8. The reaction tube as claimed in claim 7, wherein the cable or wire type temperature measuring means has flexibility.

9. The reaction tube as claimed in claim 7, wherein the cable or wire type temperature measuring means includes a thermocouple or a resistance temperature detector.

10. A reactor comprising at least one temperature measuring device claimed in claim 1,
the temperature measuring device comprising:
a thermo-well tube;
a cable or wire type temperature measuring means which is installed in a thermo-well tube; and
pulleys installed at outside of openings formed at both ends of the thermo-well tube, respectively,
wherein temperature measuring means has temperature detecting sensors disposed at an intermediate portion thereof,
the temperature detecting sensors are moved axially in the thermo-well tube by applying tension to both ends of the cable or wire type temperature measuring means,
the temperature detecting sensors include a pair of temperature sensors which are contained in a tube type junction portion and connected to each other, or a pair of temperature sensors which are respectively contained in each tube type junction portion and connected to each other by a connection portion, and
the pulleys are used when the tension is applied to the cable or wire type temperature measuring means.

11. The reactor as claimed in claim 10, wherein the cable or wire type temperature measuring means has flexibility.

12. The reactor as claimed in claim 10, wherein the cable or wire type temperature measuring means includes a thermocouple or a resistance temperature detector.

13. A reactor comprising at least one reaction tube claimed in claim 7.

* * * * *